United States Patent
Ly et al.

(10) Patent No.: US 10,666,406 B2
(45) Date of Patent: May 26, 2020

(54) SIGNALING INFORMATION IN PHYSICAL BROADCAST CHANNEL (PBCH) DEMODULATION REFERENCE SIGNALS (DMRS)

(71) Applicant: QUALCOMM Incorporated, San Diego, CA (US)

(72) Inventors: Hung Ly, San Diego, CA (US); Tao Luo, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/956,211

(22) Filed: Apr. 18, 2018

(65) Prior Publication Data

US 2018/0367269 A1    Dec. 20, 2018

Related U.S. Application Data (60) Provisional application No. 62/520,967, filed on Jun. 16, 2017.

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0051* (2013.01); *H04L 5/0053* (2013.01);
(Continued)

(58) Field of Classification Search
None
See application file for complete search history.

(56) References Cited

U.S. PATENT DOCUMENTS 9,271,288 B2    2/2016 Chen et al.
2013/0201975 A1*    8/2013 Chen ............... H04W 72/0446
                                                    370/336
(Continued)

FOREIGN PATENT DOCUMENTS

WO    WO-2013/170104 A1    11/2013
WO    WO-2017/131806 A1    8/2017

OTHER PUBLICATIONS

Intel Corporation: "Remaining Details of D2D Physical Channel Design", 3GPP Draft; R1-142031_Intel_D2D_PHY, 3rd Generation Partnership Project (3GPP), Mobile Competence Centre; 650, Route Des Lucioles; F-06921 Sophia-Antipolis Cedex; France, vol. RAN WG1, No. Seoul, Korea; May 19, 2014-May 23, 2014, May 10, 2014 (May 10, 2014), XP050814540, 11 pages, Retrieved from the Internet: URL:http://www.3gpp.org/ftp/tsg_ran/WG1_RL1/TSGR1_77/Docs/ [retrieved on May 10, 2014].

(Continued)

*Primary Examiner* — Chirag G Shah
*Assistant Examiner* — Srinivasa R Reddivalam
(74) *Attorney, Agent, or Firm* — Arent Fox LLP (57) ABSTRACT

The present disclosure relates to signaling information in physical broadcast channel (PBCH) demodulation reference signals (DMRS). In one example, a network entity may transmit the signaling information carried by a DMRS in one or more resource elements of physical broadcast channel (PBCH) symbols within a bandwidth of a primary synchronization signal and a secondary synchronization signal of a synchronization signal block. In another example, a user equipment (UE) may receive the signaling information carried by the DMRS within one or more resource elements of PBCH symbols within a bandwidth of a primary synchronization signal and a secondary synchronization signal (Continued)

of a synchronization signal block on a broadcast channel from the network entity.

27 Claims, 7 Drawing Sheets

(51) Int. Cl.
*H04W 56/00* (2009.01)
*H04W 72/04* (2009.01)

(52) U.S. Cl.
CPC ........ *H04L 27/261* (2013.01); *H04L 27/2613* (2013.01); *H04L 5/001* (2013.01); *H04L 5/005* (2013.01); *H04W 56/0015* (2013.01); *H04W 72/042* (2013.01)

(56) References Cited

U.S. PATENT DOCUMENTS

| | | | |
|---|---|---|---|
| 2015/0003356 A1 | 1/2015 | Seo et al. | |
| 2016/0197712 A1* | 7/2016 | Sorrentino | H04L 5/0051 370/336 |
| 2016/0242170 A1 | 8/2016 | Xu et al. | |
| 2017/0086153 A1* | 3/2017 | Yoon | H04W 56/001 |
| 2017/0201980 A1 | 7/2017 | Hakola et al. | |
| 2018/0198659 A1* | 7/2018 | Ko | H04L 5/005 |
| 2018/0248642 A1* | 8/2018 | Si | H04L 5/0053 |
| 2018/0262308 A1* | 9/2018 | Si | H04L 5/0051 |
| 2018/0324721 A1* | 11/2018 | Hakola | H04L 5/0053 |
| 2019/0036662 A1* | 1/2019 | Hessler | H04L 5/0051 |
| 2019/0306820 A1* | 10/2019 | Jiang | H04W 56/00 |

OTHER PUBLICATIONS

Interdigital Inc: "On NR Physical Broadcast Channel", 3GPP Draft; R1-1708327 on NR Physical Broadcast Channel, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017 (May 14, 2017), XP051273520, 5 pages, Retrieved from the Internet: URL:http://www.3gpp.org/ftp/Meetings_3GPP_SYNC/RAN1/Docs/ [retrieved on May 14, 2017].

International Search Report and Written Opinion—PCT/US2018/033712—ISA/EPO—dated Aug. 9, 2018 22 pages.
LG Electronics: "Discussion on DMRS for PSCCH and PSSCH", 3GPP Draft; R1-164507 Discussion on DMRS for PSCCH and PSSCH, 3rd Generation Partnership Project (3GPP), Mobile Competence Centre; 650, Route Des Lucioles; F-06921 Sophia-Antipolis Cedex ; France, vol. RAN WG1, No. Nanjing, China; May 23, 2016-May 27, 2016, May 14, 2016 (May 14, 2016), XP051096414, pp. 1-8, Retrieved from the Internet: URL:http://www.3gpp.org/ftp/tsg_ran/WG1_RL1/TSGR1_85/Docs/ [retrieved on May 14, 2016].
Mediatek Inc: "Discussion on PBCH Design", 3GPP Draft; R1-1707816 Discussion on PBCH Design, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017 (May 14, 2017), XP051273017, 7 pages, Retrieved from the Internet: URL:http://www.3gpp.org/ftp/Meetings_3GPP_SYNC/RAN1/Docs/ [retrieved on May 14, 2017].
Qualcomm Incorporated: "PBCH Design Considerations", 3GPP Draft; R1-1708571 PBCH Design Consideration, 3rd Generation Partnership Project (3GPP), Mobile Competence Centre; 650, Route Des Lucioles; France, vol. RAN WG1, No. Hangzhou; May 15, 2017-May 19, 2017, May 7, 2017 (May 7, 2017), XP051263213, pp. 1-4, Retrieved from the Internet: URL:http://www.3gpp.org/ftp/tsg_ran/WG1_RL1/TSGR1_89/Docs/ [retrieved on May 7, 2017].
Samsung: "Remaining Issues of NR-PBCH", 3GPP Draft; R1-1709180 PBCH, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017 (May 14, 2017), XP051274320, 9 pages, Retrieved from the Internet: URL:http://www.3gpp.org/ftp/Meetings_3GPP_SYNC/RAN1/Docs/ [retrieved on May 14, 2017].
Sony: "Discussion on NR-PBCH Reference Sequence Design", 3GPP Draft; R1-1708256_PBCH_DMRS, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017 (May 14, 2017), XP051273449, 3 pages, Retrieved from the Internet: URL:http://www.3gpp.org/ftp/Meetings_3GPP_SYNC/RAN1/Docs/ [retrieved on May 14, 2017].

* cited by examiner

SIGNALING INFORMATION IN PHYSICAL BROADCAST CHANNEL (PBCH) DEMODULATION REFERENCE SIGNALS (DMRS)

CROSS-REFERENCE TO RELATED APPLICATION(S)

This application claims the benefit of U.S. Provisional Application Ser. No. 62/520,967, entitled "SIGNALING INFORMATION IN PHYSICAL BROADCAST CHANNEL (PBCH) DEMODULATION REFERENCE SIGNALS (DMRS)" and filed on Jun. 16, 2017, which is expressly incorporated by reference herein in its entirety.

BACKGROUND

Aspects of the present disclosure relate generally to wireless communication networks, and more particularly, to signaling information in physical broadcast channel (PBCH) demodulation reference signals (DMRS).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, signaling information in PBCH DMRS may provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method for wireless communications at a network entity. The method may include transmitting signaling information carried by a demodulation reference signal (DMRS) in one or more resource elements of physical broadcast channel (PBCH) symbols within a bandwidth of a primary synchronization signal and a secondary synchronization signal of a synchronization signal block.

In another aspect, the present disclosure includes an apparatus for wireless communication comprising a memory and a processor in communication with the memory. The processor may be configured to transmit signaling information carried by a DMRS in one or more resource elements of PBCH symbols within a bandwidth of a primary synchronization signal and a secondary synchronization signal of a synchronization signal block.

In an additional aspect, the present disclosure includes an apparatus for wireless communication comprising means for transmitting signaling information carried by a DMRS in one or more resource elements of PBCH symbols within a bandwidth of a primary synchronization signal and a secondary synchronization signal of a synchronization signal block.

In yet another aspect, the present disclosure includes a computer-readable medium storing computer executable code for wireless communications comprising code for transmitting signaling information carried by a DMRS in one or more resource elements of PBCH symbols within a bandwidth of a primary synchronization signal and a secondary synchronization signal of a synchronization signal block.

In an aspect, the present disclosure includes a method for wireless communications at a user equipment. The method may include receiving signaling information carried by a DMRS within one or more resource elements of PBCH symbols within a bandwidth of a primary synchronization signal and a secondary synchronization signal of a synchronization signal block on a broadcast channel from a network entity.

In another aspect, the present disclosure includes a user equipment (UE) for wireless communications comprising a memory and a processor in communication with the memory, wherein the processor is configured to receive signaling information carried by a DMRS within one or more resource elements of PBCH symbols within a bandwidth of a primary synchronization signal and a secondary synchronization signal of a synchronization signal block on a broadcast channel from a network entity.

In an additional aspect, the present disclosure includes a UE for wireless communications comprising means for receiving signaling information carried by a DMRS within one or more resource elements of PBCH symbols within a bandwidth of a primary synchronization signal and a secondary synchronization signal of a synchronization signal block on a broadcast channel from a network entity.

In yet another aspect, the present disclosure a computer-readable medium storing computer executable code for wireless communications comprising code for receiving signaling information carried by a DMRS within one or more resource elements of PBCH symbols within a bandwidth of a primary synchronization signal and a secondary synchronization signal of a synchronization signal block on a broadcast channel from a network entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to signaling information in physical broadcast channel (PBCH) demodulation reference signals (DMRS). Specifically, network or cell synchronization may be initialed performed between a user equipment (UE) and a network entity (e.g., base station). During or as part of synchronization, the network entity may provide synchronization signals on the downlink to the UE. Such synchronization signals may include a primary synchronization signal (PSS) and/or a secondary synchronization signal (SSS). PSS may be used to synchronize timing during cell search. SSS may be used to synchronize timing and/or to transmit physical cell identification during cell search. Such information may be transmitted on a downlink channel such as PBCH. DMRS may be also be transmitted on PBCH. In particular, DMRS may facilitate channel estimation and coherent demodulation of an uplink and/or downlink communication channel by the UE. DMRS may be transmitted in one or more resource elements of PBCH symbols within a bandwidth. The DMRS density along the bandwidth, which may include an SSS and PSS bandwidth may vary. For example, DMRS density may be less within an SSS bandwidth as compared to outside the SSS bandwidth. Thus, it may be beneficial to transmit DMRS within a bandwidth having a smaller density.

As such, the present aspects provide information signaling carried by DMRS in an SSS bandwidth. For example, in an aspect, a network entity may transmit signaling information carried by a DMRS in one or more resource elements of PBCH symbols within a bandwidth of a primary synchronization signal and a secondary synchronization signal of a synchronization signal block. Additionally, in an aspect, a UE may receive signaling information carried by a DMRS within one or more resource elements of PBCH symbols within a bandwidth of a primary synchronization signal and a secondary synchronization signal of a synchronization signal block on a broadcast channel from a network entity.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
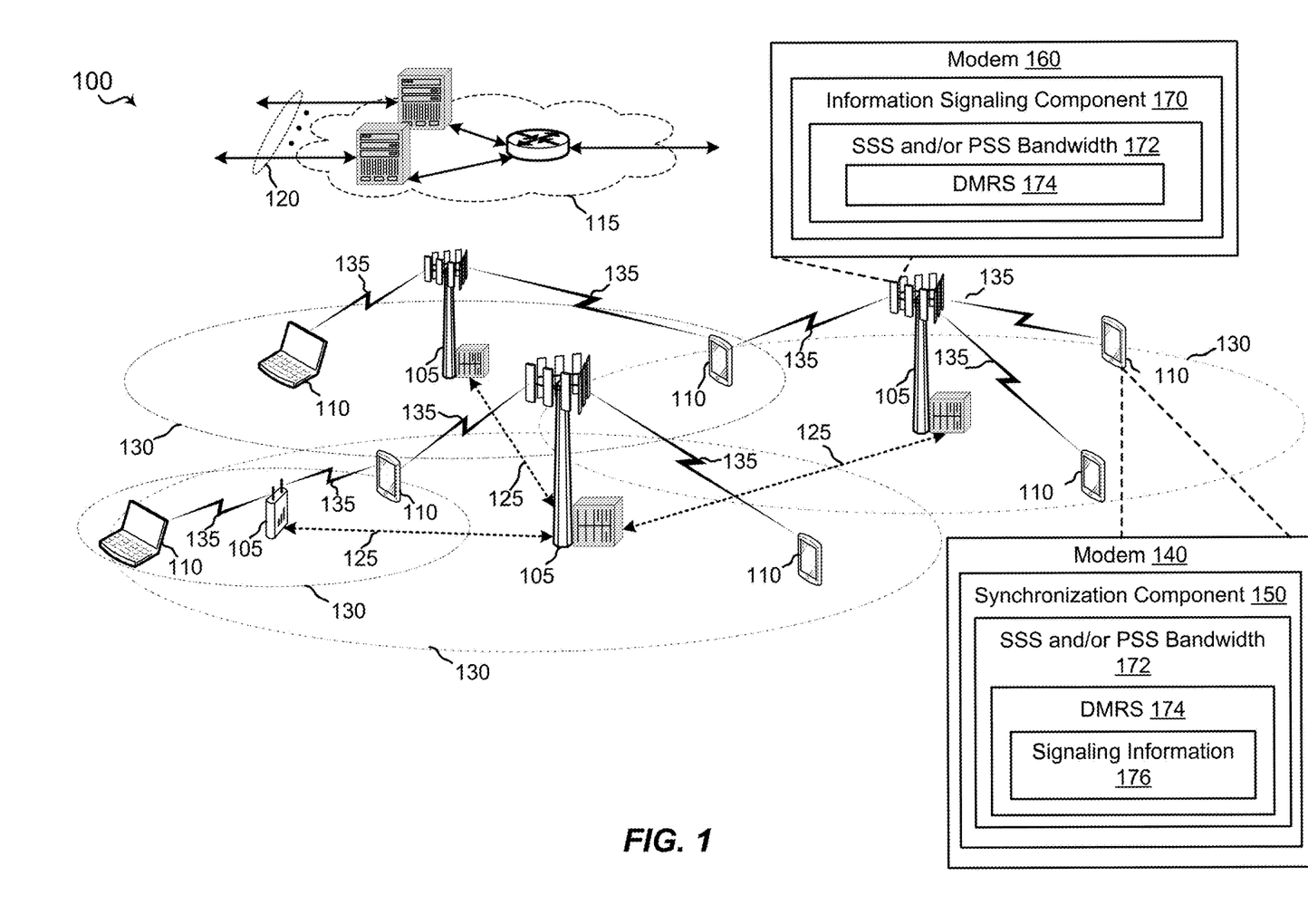
FIG. 1 is a schematic diagram of an example of a wireless communication network including at least one base station having an information signaling component and at least one user equipment (UE) having a synchronization component.

Referring to FIG. 1, in accordance with various aspects of the present disclosure, an example wireless communication network 100 may include at least one UE 110 in communication with a base station 105. The base station 105 may have a modem 160, which in turn includes an information signaling component 170 that may transmit, to the UE 110, signaling information 176 carried by a DMRS 174 in one or more resource elements of PBCH symbols within a bandwidth of a PSS and a SSS of a synchronization signal block 172. For example, the information signaling component 170 may transmit the signaling information 176 carried in the DMRS 174 within the SSS and/or SSS bandwidth 172.

In an aspect, in instances where the DMRS 174 within the SSS and/or PSS bandwidth 172 carried at least some signaling information 176, the signaling information 176 may be carried in the DMRS 174 by having different DMRS sequences. For example, in some aspects, four DMRS sequences may be used to carry two bits. In a further aspect, the signaling information 176 may be carried in a phase of the DMRS 174. For instance, the information signaling component 170 may be configured to initially generate a base DMRS sequence in a frequency domain. The information signaling component 170 may then apply a phase offset to the generated base DMRS sequence. In an example where two information bits are carried in DMRS 174, the phase offset may be selected from 0, pi/2, pi, or 3 pi/2.

In some aspects, the signaling information 176 carried in DMRS 174 within the SSS and/or PSS bandwidth 172 may include part of a system frame number and/or a synchronization signal block time index or part of a synchronization signal block time index. The signaling information 176 carried in the bits of the DMRS 174 may be additionally transmitted in PBCH (e.g., MIB) through different scrambling or as part of a payload or different resource element mapping (e.g., rate-matching using different offset when mapped to resources), or a combination thereof. Further, redundancy information may be provided for the UE 110 so as to allow the UE 110 to determine how to the use the information for simplifying processing.

Wireless communication network 100 may also include at least one UE 110 with a modem 140 having a synchronization component 150 to receive the signaling information 176 carried by the DMRS 174 within one or more resource elements of PBCH symbols within a PSS and SSS bandwidth 172 of a synchronization signal block on a broadcast channel from the base station 105. For example, the UE 110 may use the signaling information 176 carried in carried in PBCH DMRS 174 within SSS and/or PSS bandwidth 172 to facilitate synchronization with the network. Specifically, in some aspects, the signaling information may be used by all UEs including UE 110 to complete a synchronization procedure. In some aspects, the signaling information 176 may be optional such that some UEs may not use such signaling information 176 in the SSS and/or PSS bandwidth 172. However, some UEs may use the signaling information 176 to reduce the receiver complexity.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2A:
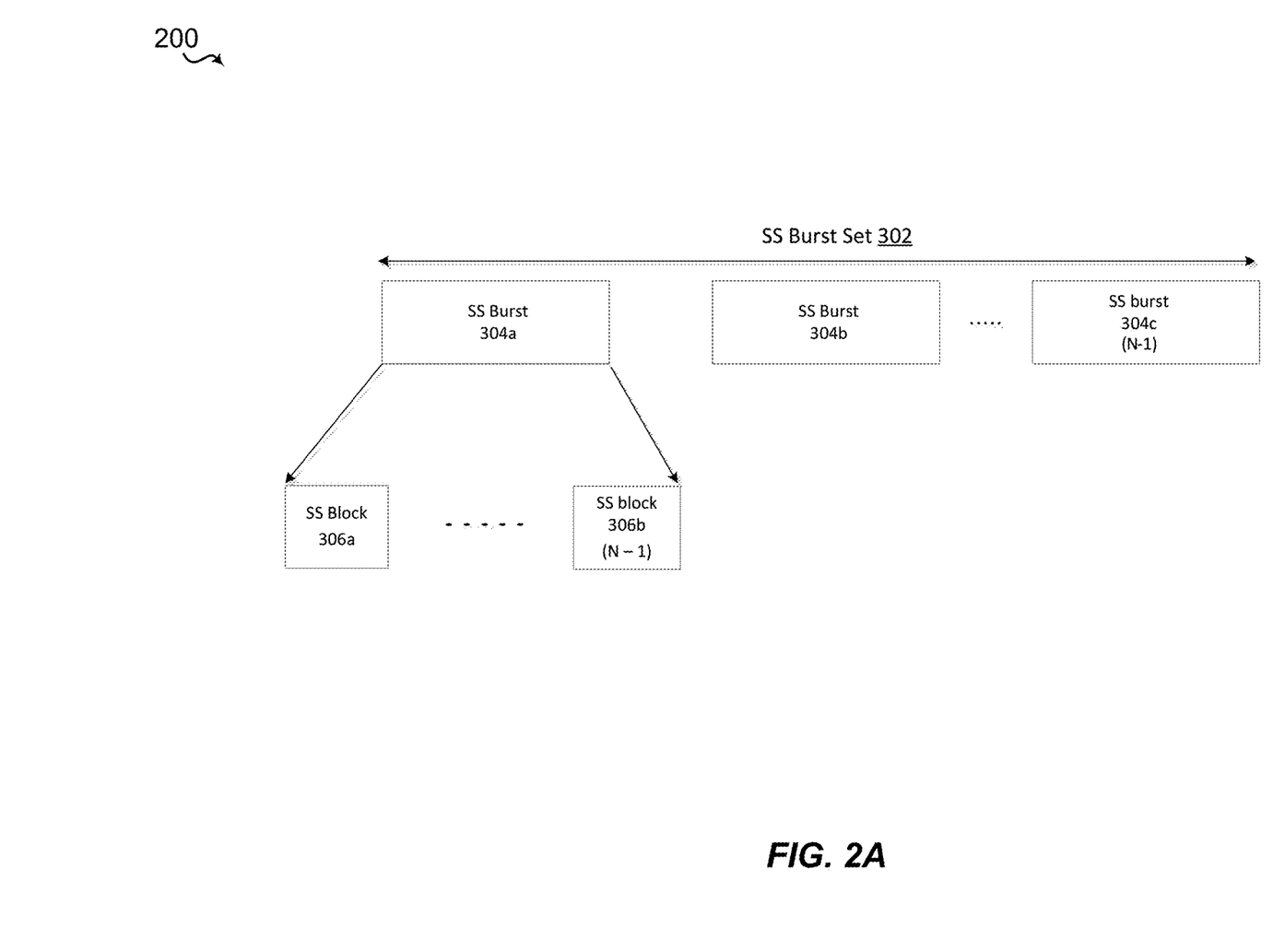
FIG. 2A is a conceptual diagram of a synchronization signal structure for transmitting signaling information.

FIG. 2A is a conceptual diagram of a synchronization signal structure 200 for transmitting the signaling information 178. Synchronization signals may be transmitted within a synchronization signal burst set 302, which may include one or more synchronization signal bursts 304*a*, 304*b*, and/or 304*c*. Hence, a synchronization signal burst set 302 corresponds to a set of synchronization signal bursts. In some aspects, synchronization signal burst set 302 may be transmitted periodically with a pre-defined synchronization signal burst set (SSBS) periodicity (10 ms, 20 ms, etc.). A synchronization signal burst corresponds to a set of synchronization signal blocks. Each synchronization signal block may include a PSS for signaling symbol timing, an SSS for signaling physical cell ID (e.g., together with PSS) and frame timing, and/or PBCH for signaling master information block (MIB) to support the UE 110 in initial access procedures.

Figure 2B:
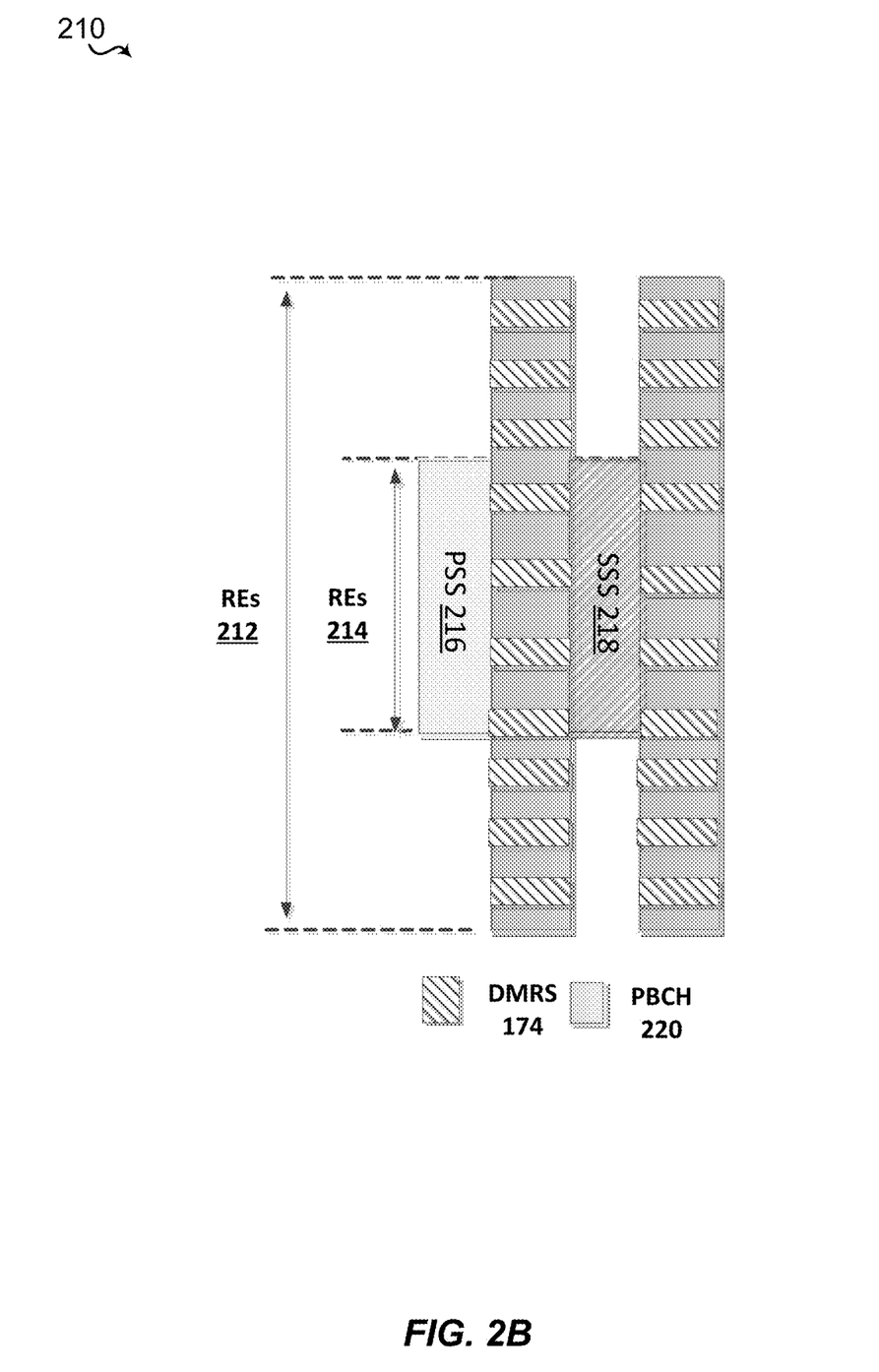
FIG. 2B is a conceptual diagram of an example synchronization signal block used to transmit at least a DMRS including signaling information.

FIG. 2B is a conceptual diagram of an example synchronization signal block used to transmit at least the DMRS 174 including the signaling information 176. Specifically, PBCH DMRS may be used for PBCH demodulation. The synchronization signal block may include one or more resource elements 212, of which one or more resource elements 214 are allocated or reserved for the SSS 218 and/or PSS 216 bandwidth. Further, DMRS may be frequency division multiplexed with PBCH 220. The DMRS density in a PBCH symbol may vary between the SSS 218 bandwidth and outside the SSS 218 bandwidth. For example, the DMRS density within the SSS 218 bandwidth can be sparser than the DMRS density outside SSS bandwidth. In some aspects, the DMRS density outside the SSS 218 bandwidth may be ⅓ while the DMRS density may be ⅙ within the SSS 218 bandwidth. In some aspects, referring to the SSS 218 bandwidth may also include the PSS 216. In some aspects, the PBCH 220 within the SSS 218 bandwidth may be self-decodable such that the UE 110 may use or decode only the SSS 218 bandwidth to detect PSS 216/SSS 218 and decode PBCH 220 successfully.

Figure 3:
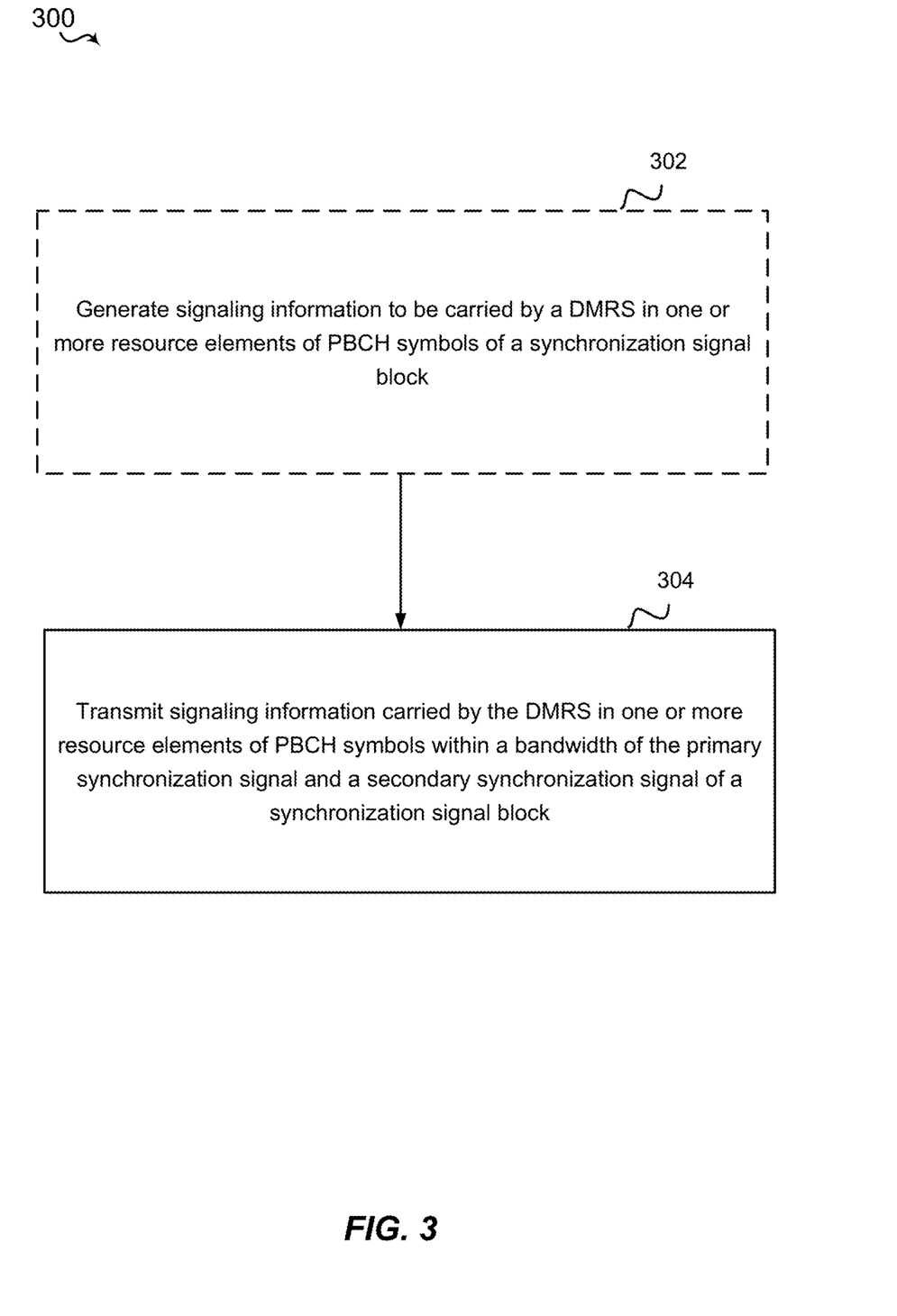
FIG. 3 is a flow diagram of an example of a method of wireless communication at a network entity.

Referring to FIG. 3, for example, a method 300 of wireless communication in operating a network entity such as base station 105 according to the above-described aspects to provide information signaling carried by DMRS within an SSS and/or PSS bandwidth includes one or more of the herein-defined actions.

At block 302, the method 300 may generate signaling information to be carried by a DMRS in one or more resource elements of PBCH symbols of a synchronization signal block. For example, in an aspect, base station 105 may execute information signaling component 170 to generate signaling information 176 to be carried by a DMRS 174 in one or more resource elements 214 of PBCH symbols 220 of a synchronization signal block 210.

At block 304, the method 300 may transmit signaling information carried by a DMRS in one or more resource elements of PBCH symbols within a bandwidth of a primary synchronization signal and a secondary synchronization signal of a synchronization signal block. For example, in an aspect, base station 105 may execute information signaling component 170 to send signaling information 176 carried by a DMRS 174 in one or more resource elements 214 of PBCH symbols 220 within a bandwidth of a primary synchronization signal (PSS 216) and a secondary synchronization signal (SSS 218) of a synchronization signal block 210.

In some aspects, transmitting the signaling information 176 carried by the DMRS 174 in one or more resource elements 214 of PBCH symbols within a bandwidth of a primary synchronization signal (PSS 216) and a secondary synchronization signal (SSS 218) of a synchronization signal block 210 may include transmitting the DMRS 174 according to one or more distinct DMRS sequences. In some aspects, the one or more distinct DMRS sequences may be based on a number of signaling bits. In some aspects, the distinct DMRS sequences may correspond to orthogonal or quasi-orthogonal DMRS sequences.

In some aspects, transmitting the signaling information 176 carried by the DMRS 174 in one or more resource elements 214 of PBCH symbols within a bandwidth of a primary synchronization signal (PSS 216) and a secondary synchronization signal (SSS 218) of a synchronization signal block 210 may include transmitting the signaling information 176 within a phase of the DMRS 174.

In some aspects, transmitting the signaling information 176 within a phase of the DMRS 174 may include generating a DMRS sequence in a frequency domain and applying a phase offset to the DMRS sequence to obtain an offset DMRS sequence.

In some aspects, transmitting the signaling information 176 carried by the DMRS 174 in one or more resource elements 214 of PBCH symbols within a bandwidth of a primary synchronization signal (PSS 216) and a secondary synchronization signal (SSS 218) of a synchronization signal block 210 may include at least one of forgoing transmission of the signaling information 176 outside the bandwidth of the primary synchronization signal (PSS 216) or the secondary synchronization signal (SSS 218), transmitting distinct signaling information different from the signaling information 176 carried by the DMRS 174 outside the bandwidth of the primary synchronization signal (PSS 216) or the bandwidth of the secondary synchronization signal (SSS 218), or transmitting the signaling information 176 in the DMRS 174 outside the bandwidth of the primary synchronization signal (PSS 216) or the bandwidth of the secondary synchronization signal (SSS 218).

In some aspects, the DMRS 174 may include at least a portion of a system frame number or at least a portion of a synchronization signal block time index value. In some aspects, the signaling information 176 facilitates completion of network synchronization by at least one of a set of UEs or a subset of the set of UEs.

In some aspects, transmitting the signaling information 176 carried by the DMRS 174 in one or more resource elements 214 of PBCH symbols within a bandwidth of a primary synchronization signal (PSS 216) and a secondary synchronization signal (SSS 218) of a synchronization signal block 210 may include transmitting within a physical broadcast channel portion based on at least one of a distinct scrambling scheme, as part of a payload, or a distinct resource element mapping.

Figure 4:
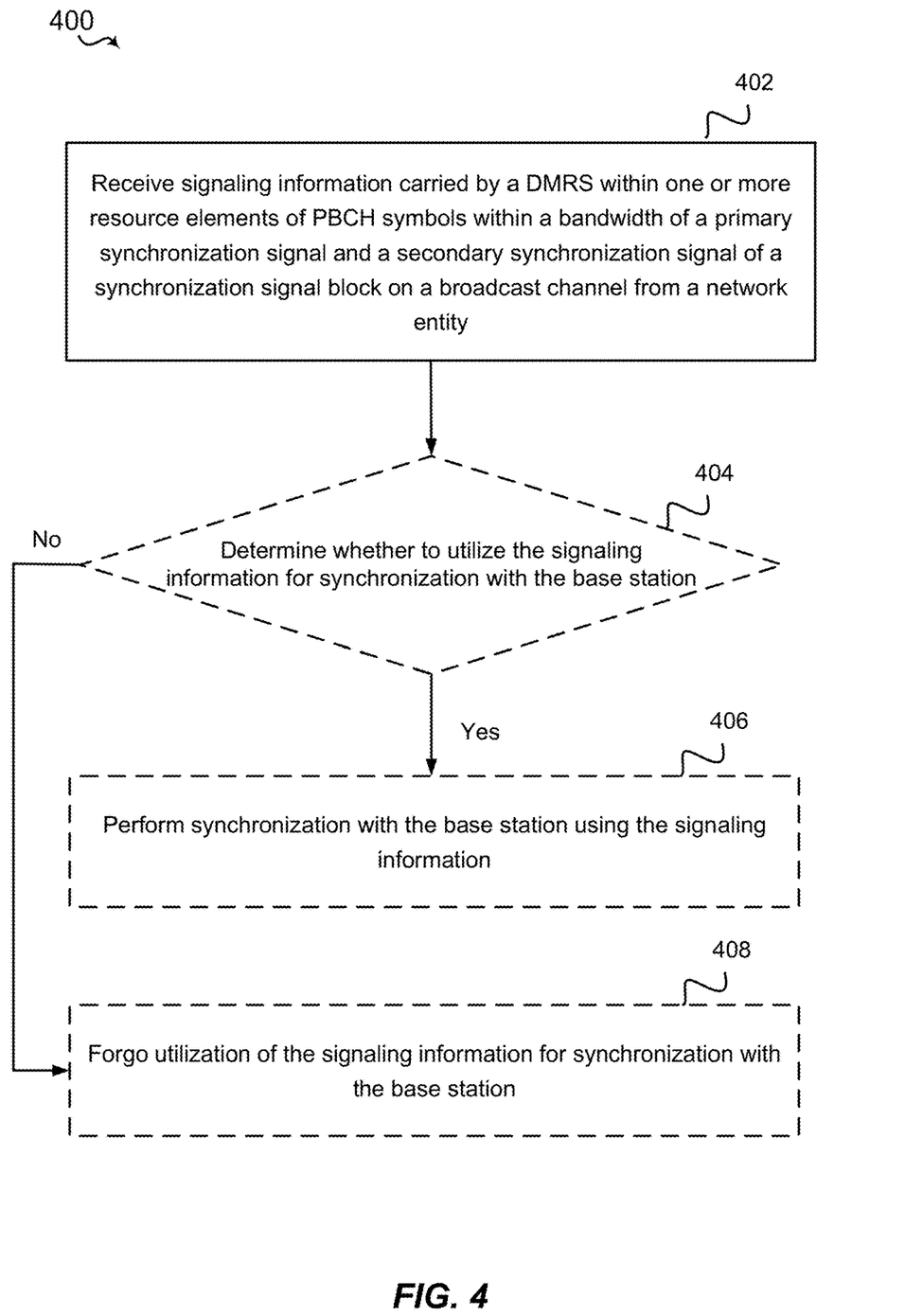
FIG. 4 is a flow diagram of an example of a method of wireless communication at a UE.

Referring to FIG. 4, for example, a method 400 of wireless communication in operating UE 110 according to the above-described aspects to receive signaling information carried by a DMRS includes one or more of the herein-defined actions.

At block 402, the method 400 may receive signaling information carried by a DMRS within one or more resource elements of PBCH symbols within a bandwidth of a primary synchronization signal and a secondary synchronization signal of a synchronization signal block on a broadcast channel from a network entity. For example, in an aspect, the UE 110 may execute synchronization component 150 to receive signaling information 176 carried by a DMRS 174 within one or more resource elements 214 of PBCH symbols 220 within a bandwidth of a primary synchronization signal (PSS 216) and a secondary synchronization signal (SSS 218) of a synchronization signal block 210 on a broadcast channel from a base station 105.

In some aspects, receiving the signaling information 176 carried by the DMRS 174 within one or more resource elements of PBCH symbols 220 within a bandwidth of the PSS 216 and the SSS 218 of the synchronization signal block 210 may include receiving the DMRS 174 according to one or more distinct DMRS sequences. Further, in some aspects, the one or more distinct DMRS sequences may be based on a number of signaling bits.

In some aspects, receiving the signaling information 176 carried by the DMRS 174 within one or more resource elements of PBCH symbols 220 within a bandwidth of the PSS 216 and the SSS 218 of the synchronization signal block 210 may include receiving the signaling information 176 within a phase of the DMRS 174. For example, the phase of the DMRS 174 may correspond to a phase offset applied to a DMRS sequence.

In some aspects, receiving the signaling information 176 carried by the DMRS 174 within one or more resource elements of PBCH symbols 220 within a bandwidth of the PSS 216 and the SSS 218 of the synchronization signal block 210 may include at least one of receiving distinct signaling information different from the signaling information 176 carried by the DMRS 174 outside the bandwidth of the PSS 216 or the bandwidth of the SSS 218, or receiving the signaling information 176 in the DMRS 174 outside the bandwidth of the PSS 216 or the bandwidth of the SSS 218.

Further, in some aspects, the DMRS 174 may include at least a portion of a system frame number or at least a portion of a synchronization signal block time index value.

In some aspects, receiving the signaling information 176 carried by the DMRS 174 within one or more resource elements of PBCH symbols 220 within a bandwidth of the PSS 216 and the SSS 218 of the synchronization signal block 210 may include receiving within a physical broadcast channel portion based on at least one of a distinct scrambling scheme, as part of a payload, or a distinct resource element mapping.

Additionally, in some aspects, the signaling information 176 may facilitate completion of network synchronization by the UE 110.

At block 404, the method 400 may determine whether to utilize the signaling information for synchronization with the base station. For example, in an aspect, the UE 110 may execute synchronization component 150 to determine whether to utilize the signaling information 176 for synchronization with the base station 105.

The method 400 may proceed to block 406 based on determining to utilize the signaling information 176 for synchronization with the base station 105. At block 406, the method 400 may perform synchronization with the base station using the signaling information. For example, in an aspect, the UE 110 may execute synchronization component 150 to perform synchronization with the base station 105 using the signaling information 176 based on determining to utilize the signaling information 176 for synchronization with the base station 105.

The method may proceed to block 408 based on determining not to utilize the signaling information 176 for synchronization. At block 408, the method 400 may forgo utilization of the signaling information for synchronization with the base station. For example, in an aspect, the UE 110 may execute synchronization component 150 to forgo utilization of the signaling information 176 for synchronization with the base station 105 based on determining not to utilize the signaling information 176 for synchronization.

Figure 5:
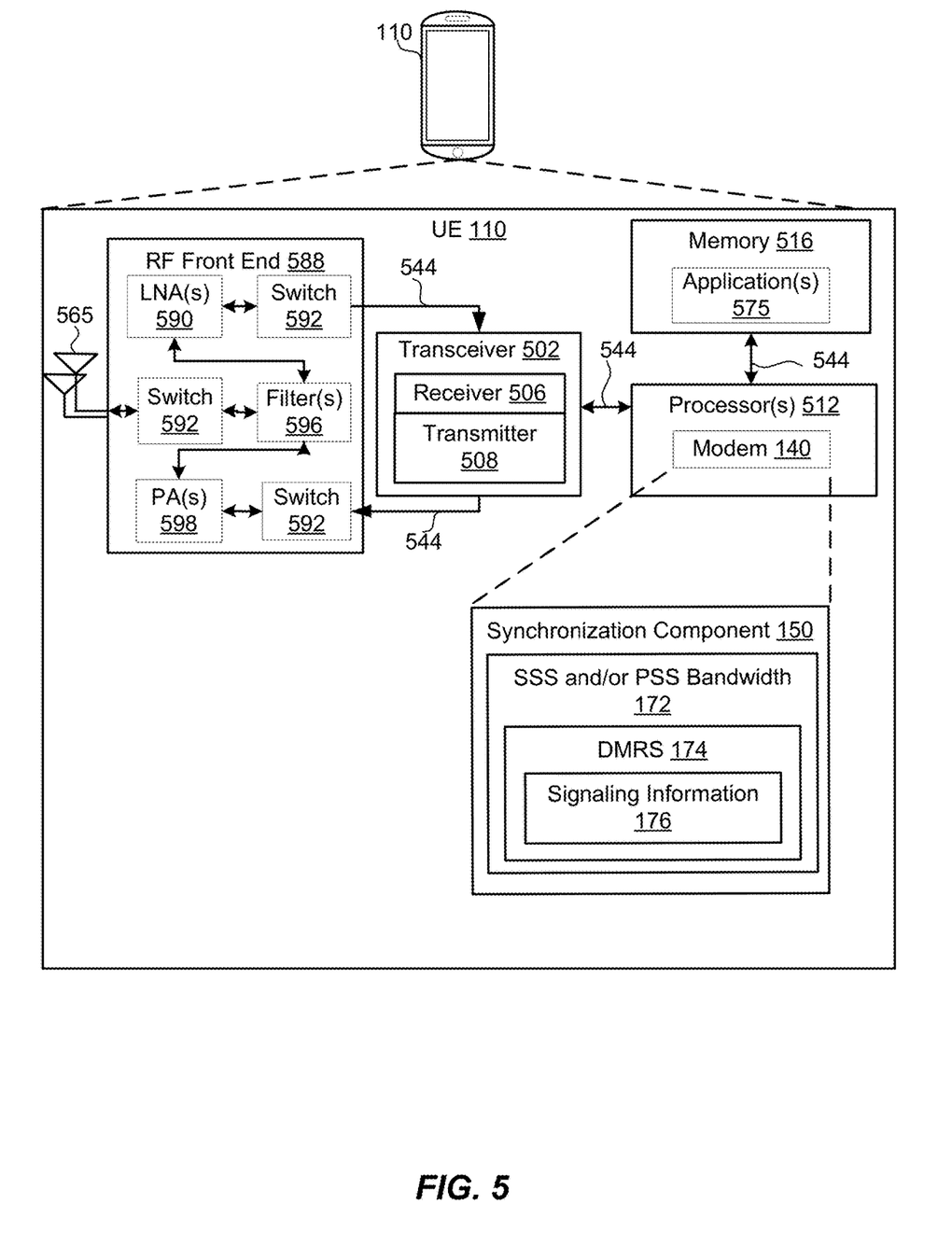
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and synchronization component 150 as described herein. Further, the one or more processors 512, modem 514, memory 516, transceiver 502, radio frequency (RF) front end 588 and one or more antennas 565, may be configured to support voice and/or data calls (simultaneously or non-simultaneously) in one or more radio access technologies. In some aspects, the modem 514 may be the same as or similar to the modem 140.

In an aspect, the one or more processors 512 can include a modem 514 that uses one or more modem processors. The various functions related to resource identification component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with resource identification component 150 may be performed by transceiver 502.

Also, memory 516 may be configured to store data used herein and/or local versions of applications 575 or resource identification component 150 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining resource identification component 150 and/or one or more of its subcomponents, and/or data associated therewith, when UE 110 is operating at least one processor 512 to execute resource identification component 150 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a RF receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may include, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 125 or wireless transmissions transmitted by UE 110. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and a corresponding specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 125 or one or more cells associated with one or more base stations 125. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
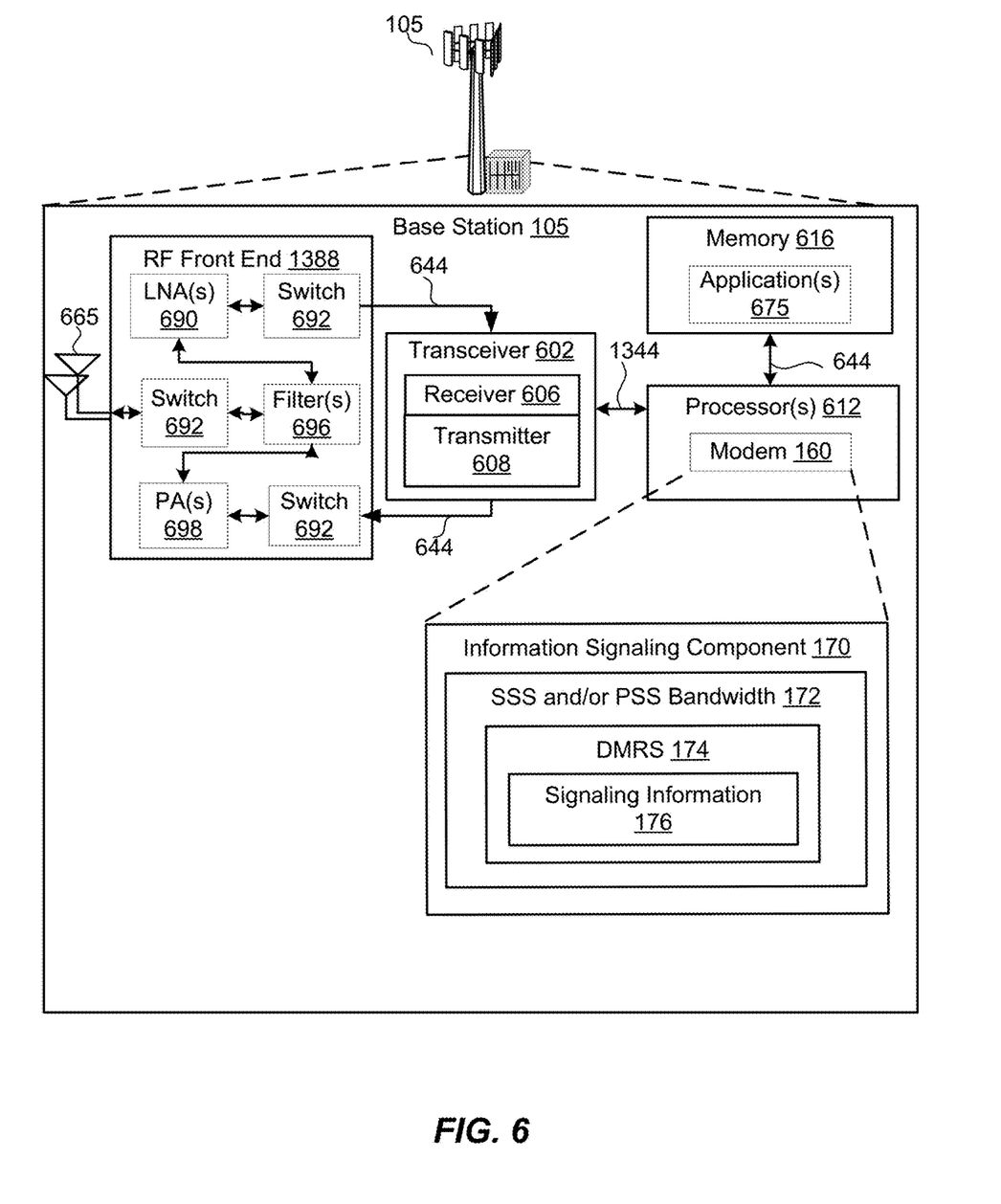
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and information signaling component 170 to enable one or more of the functions described herein.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a network entity, comprising:
   generating a demodulation reference signal (DMRS) sequence in a frequency domain;
   applying a phase offset to the DMRS sequence to obtain an offset DMRS sequence;
   generating signaling information to be carried by a DMRS associated with the offset DMRS sequence in one or more resource elements of physical broadcast channel (PBCH) symbols of a synchronization signal block, wherein a phase of the DMRS corresponds to the phase offset; and
   transmitting the signaling information within the phase of the DMRS in the one or more resource elements of the PBCH symbols within a bandwidth of at least one of a primary synchronization signal and a secondary synchronization signal of the synchronization signal block, wherein transmitting the signaling information includes at least one of:
   forgoing transmission of the signaling information outside the bandwidth of the primary synchronization signal or the secondary synchronization signal, or
   transmitting distinct signaling information different from the signaling information carried by the DMRS outside the bandwidth of the primary synchronization signal or the bandwidth of the secondary synchronization signal.

2. The method of claim 1, wherein transmitting the signaling information includes transmitting the DMRS according to one or more distinct DMRS sequences.

3. The method of claim 2, wherein the one or more distinct DMRS sequences are based on a number of signaling bits.

4. The method of claim 1, wherein transmitting the signaling information further includes:
   transmitting the signaling information in the DMRS outside the bandwidth of the primary synchronization signal or the bandwidth of the secondary synchronization signal.

5. The method of claim 1, wherein the DMRS includes at least a portion of a system frame number or at least a portion of a synchronization signal block time index value.

6. The method of claim 1, wherein transmitting the signaling information includes transmitting within a physical broadcast channel portion based on at least one of a distinct scrambling scheme, as part of a payload, or a distinct resource element mapping.

7. The method of claim 1, wherein the signaling information facilitates completion of network synchronization by at least one of a set of UEs or a subset of the set of UEs.

8. The method of claim 1, wherein the signaling information includes redundancy information associated with the DMRS.

9. The method of claim 1, wherein a DMRS density within the bandwidth of at least one of the primary synchronization signal or the secondary synchronization signal is less than a DMRS density outside the bandwidth.

10. A method of wireless communications at a user equipment (UE), comprising:
    receiving signaling information within a phase of a demodulation reference signal (DMRS) within one or more resource elements of physical broadcast channel (PBCH) symbols within a bandwidth of a primary synchronization signal and a secondary synchronization signal of a synchronization signal block on a broadcast channel from a network entity, wherein the phase of the DMRS corresponds to a phase offset applied to a DMRS sequence associated with the DMRS, wherein receiving the signaling information includes receiving distinct signaling information different from the signaling information carried by the DMRS outside the bandwidth of the primary synchronization signal or the bandwidth of the secondary synchronization signal;
    determining whether to utilize the signaling information for synchronization with the network entity;
    performing synchronization with the network entity using the signaling information based on determining to utilize the signaling information for synchronization with the network entity; and
    forgoing utilization of the signaling information for synchronization with the network entity based on determining not to utilize the signaling information for synchronization.

11. The method of claim 10, wherein receiving the signaling information further includes:
    receiving the signaling information in the DMRS outside the bandwidth of the primary synchronization signal or the bandwidth of the secondary synchronization signal.

12. The method of claim 10, wherein receiving the signaling information includes receiving the DMRS according to one or more distinct DMRS sequences.

13. The method of claim 12, wherein the one or more distinct DMRS sequences are based on a number of signaling bits.

14. The method of claim 10, wherein the DMRS includes at least a portion of a system frame number or at least a portion of a synchronization signal block time index value.

15. The method of claim 10, wherein receiving the signaling information includes receiving within a physical broadcast channel portion based on at least one of a distinct scrambling scheme, as part of a payload, or a distinct resource element mapping.

16. The method of claim 10, wherein the signaling information facilitates completion of network synchronization by the UE.

17. An apparatus, comprising:
a memory; and
a processor in communication with the memory, wherein the processor is configured to:
generate a demodulation reference signal (DMRS) sequence in a frequency domain;
apply a phase offset to the DMRS sequence to obtain an offset DMRS sequence;
generate signaling information to be carried by a DMRS associated with the offset DMRS sequence in one or more resource elements of physical broadcast channel (PBCH) symbols of a synchronization signal block, wherein a phase of the DMRS corresponds to the phase offset; and
transmit the signaling information within the phase of the DMRS in the one or more resource elements of the PBCH symbols within a bandwidth of at least one of a primary synchronization signal and a secondary synchronization signal of the synchronization signal block, wherein to transmit the signaling information, the processor is further configured to at least one of:
forgo transmission of the signaling information outside the bandwidth of the primary synchronization signal or the secondary synchronization signal, or
transmit distinct signaling information different from the signaling information carried by the DMRS outside the bandwidth of the primary synchronization signal or the bandwidth of the secondary synchronization signal.

18. The apparatus of claim 17, wherein to transmit the signaling information, the processor is further configured to transmit the DMRS according to one or more distinct DMRS sequences.

19. The apparatus of claim 17, wherein to transmit the signaling information, the processor is further configured to:
transmit the signaling information in the DMRS outside the bandwidth of the primary synchronization signal or the bandwidth of the secondary synchronization signal.

20. The apparatus of claim 17, wherein the DMRS includes at least a portion of a system frame number or at least a portion of a synchronization signal block time index value.

21. The apparatus of claim 17, wherein to transmit the signaling information, the processor is further configured to transmit within a physical broadcast channel portion based on at least one of a distinct scrambling scheme, as part of a payload, or a distinct resource element mapping.

22. The apparatus of claim 17, wherein the signaling information includes redundancy information associated with the DMRS.

23. The apparatus of claim 17, wherein a DMRS density within the bandwidth of at least one of the primary synchronization signal or the secondary synchronization signal is less than a DMRS density outside the bandwidth.

24. A user equipment (UE) for wireless communications, comprising:
a memory; and
a processor in communication with the memory, wherein the processor is configured to:
receive signaling information within a phase of a demodulation reference signal (DMRS) within one or more resource elements of physical broadcast channel (PBCH) symbols within a bandwidth of a primary synchronization signal and a secondary synchronization signal of a synchronization signal block on a broadcast channel from a network entity, wherein the phase of the DMRS corresponds to a phase offset applied to a DMRS sequence associated with the DMRS, wherein to receive the signaling information, the processor is further configured to receive distinct signaling information different from the signaling information carried by the DMRS outside the bandwidth of the primary synchronization signal or the bandwidth of the secondary synchronization signal
determine whether to utilize the signaling information for synchronization with the network entity;
perform synchronization with the network entity using the signaling information based on determining to utilize the signaling information for synchronization with the network entity; and
forgo utilization of the signaling information for synchronization with the network entity based on determining not to utilize the signaling information for synchronization.

25. The UE of claim 24, wherein to receive the signaling information, the processor is further configured to receive the DMRS according to one or more distinct DMRS sequences.

26. The UE of claim 24, wherein to receive the signaling information, the processor is further configured to at least one of:
receive the signaling information in the DMRS outside the bandwidth of the primary synchronization signal or the bandwidth of the secondary synchronization signal.

27. The UE of claim 24, wherein to receive the signaling information, the processor is further configured to receive within a physical broadcast channel portion based on at least one of a distinct scrambling scheme, as part of a payload, or a distinct resource element mapping.

* * * * *